April 14, 1970   FLETCHER DE FISHER   3,506,124
STRATIFIER FOR SEPARATING ORE
Filed March 6, 1968   2 Sheets-Sheet 1
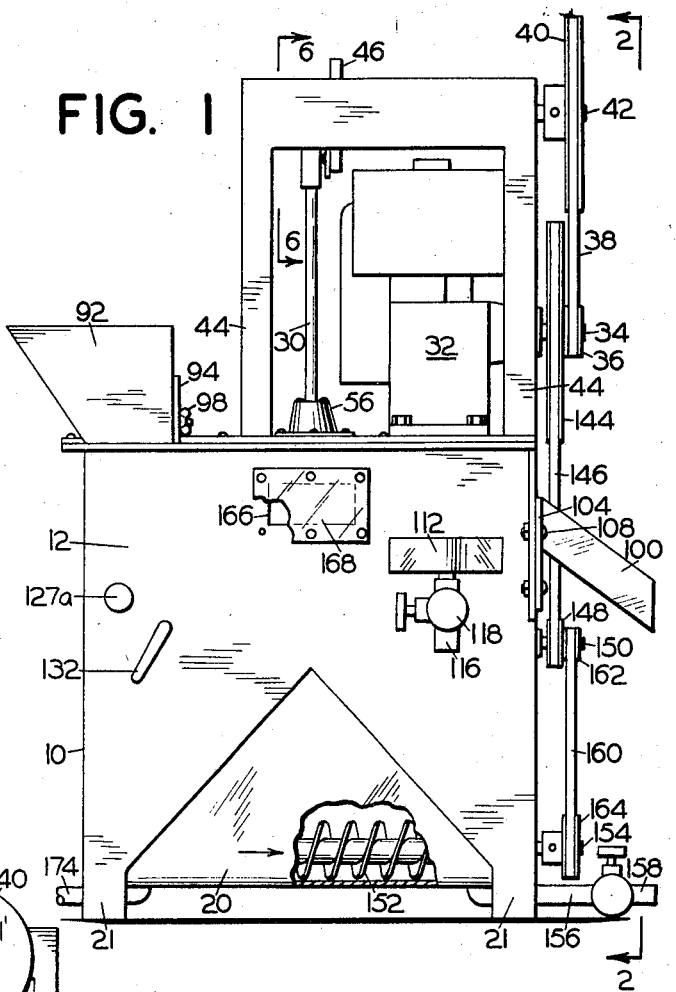
FIG. 1
FIG. 6
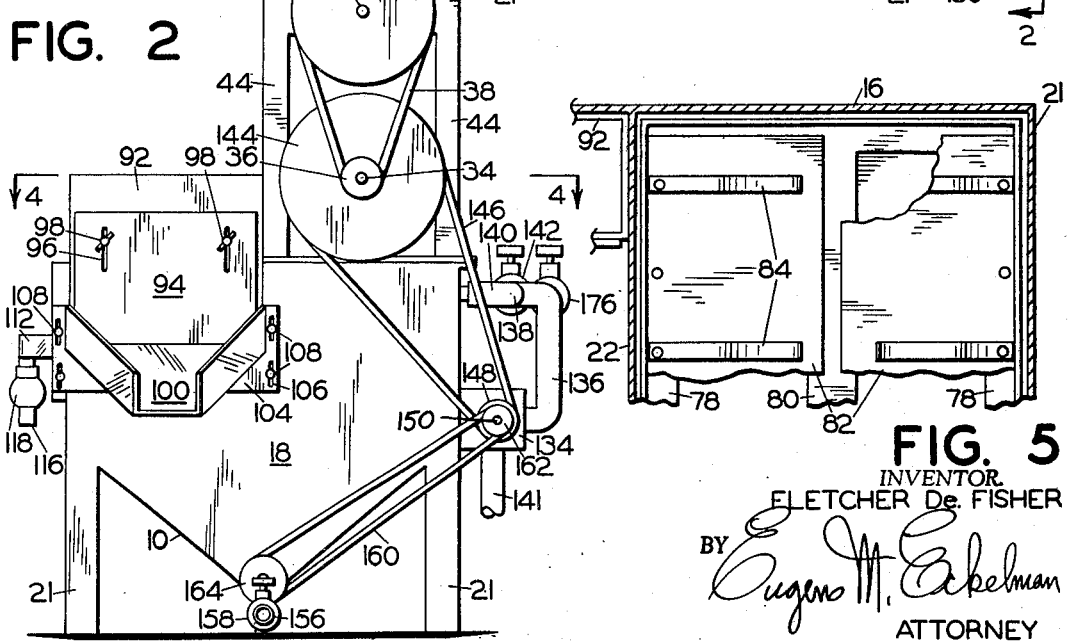
FIG. 2
FIG. 5
INVENTOR.
FLETCHER De. FISHER
BY Eugene M. Eckelman
ATTORNEY April 14, 1970 FLETCHER DE FISHER 3,506,124
STRATIFIER FOR SEPARATING ORE Filed March 6, 1968 2 Sheets-Sheet 2

INVENTOR.
FLETCHER De. FISHER
BY Eugene M. Eckelman
ATTORNEY

3,506,124
STRATIFIER FOR SEPARATING ORE
Fletcher De Fisher, Long Beach, Wash.
(Clayton, Idaho 83227)
Filed Mar. 6, 1968, Ser. No. 715,122
Int. Cl. B03b 3/28
U.S. Cl. 209—456      3 Claims

ABSTRACT OF THE DISCLOSURE

A stratifier including a tank, a pumping chamber and a separating chamber. The pumping chamber has a motor driven plunger and valve assembly capable of causing a pulsating action in liquid in the separating chamber. Included in the separating chamber is a screen on which ore material is deposited. Baffle plates are used under the screen to control movement of the ore material on the screen. A first valve is disposed above the screen for receiving large particles and the tank has a narrow bottom portion for receiving concentrates passing through the screen. An auger is disposed at the bottom of the tank for discharging the concentrates. Fluid is fed to the pumping chamber by a pump through a valved manifold, and a valved line also leads from the pump to the bottom of the tank for flushing the latter.

---

This invention relates to new and useful improvements in a method and apparatus for separating ore.

A primary objective of the present invention is to provide a method and apparatus for separating ore wherein ore supported on a screen is subjected to a pulsating movement of liquid.

More particularly, objects of the present invention are to provide a tank in which fluid is admitted and in which tank is incorporated a reciprocating plunger and a screen for supporting ore to be separated, the plunger causing a pulsating movement of the liquid to agitate the ore and liquid and cause the heavier specific gravity particles to settle and cause the lighter specific gravity particles to be suspended in the liquid and carried away through the outlet means; to provide such an apparatus having a novel structural arrangement of inlet and outlet means; to provide a novel arrangement of particle receiving means comprising a first discharge outlet above the screen for large particles, a bottom discharge means for concentrates which have moved downwardly through the screen, and outlet means which carry away the tailings; to provide a novel baffle plate arrangement under the screen to control movement of ore and liquid in the separating chamber; to provide a novel arrangement of valve and reciprocating plunger for producing the pulsating movement of the liquid; and to provide novel fluid supply means for the pumping chamber as well as means for flushing out the tank.

The invention will be better understood and additional objects and advantages will become apparent from the following description taken in connection with the accompanying drawings which illustrate a preferred form of the device.

In the drawings:

FIGURE 1 is a side elevational view of the present ore separating apparatus;

FIGURE 2 is an end view of said apparatus taken on the line 2—2 of FIGURE 1;

FIGURE 5 is a fragmentary sectional view taken on the line 5—5 of FIGURE 3; and

FIGURE 6 is an enlarged fragmentary elevational view of a portion of reciprocating drive means taken on the line 6—6 of FIGURE 1.

Figure 4:
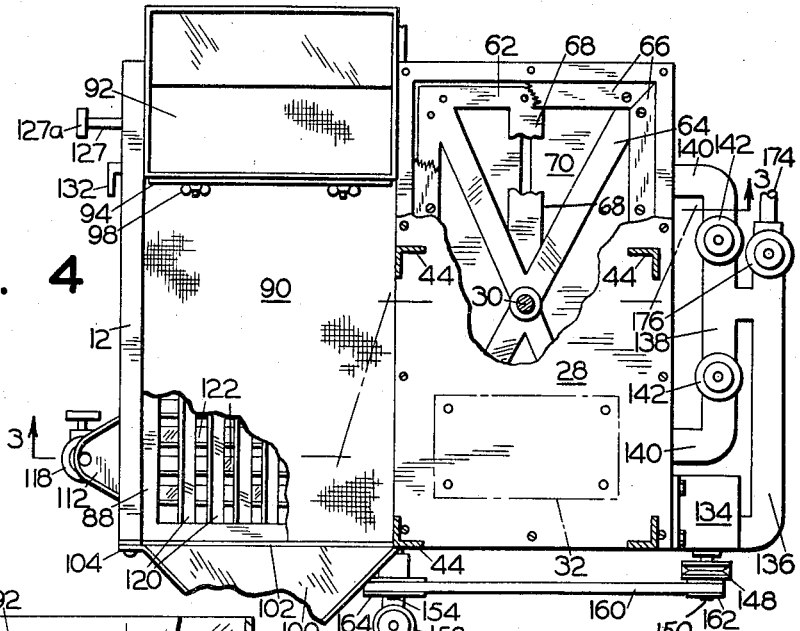
FIGURE 4 is a plan view of the apparatus partly broken away to show internal parts.

The method and apparatus of the invention are intended to separate ore particles which have different specific gravities. It is designed for use with ore material of rather fine particle state such as sand, or other raw material which has been ground or reduced in particle size. The device may be used for separating out valuable ore particles or too it can serve the important purpose of washing a particle type raw material. It comprises a tank 10 having side walls 12 and 14, best shown in FIGURE 3, a front wall 16, also shown in FIGURE 3, a rear wall 18, FIGURE 2, and a trough-shaped bottom wall 20, FIGURE 3. The tank is supported by suitable legs 21.

Figure 3:
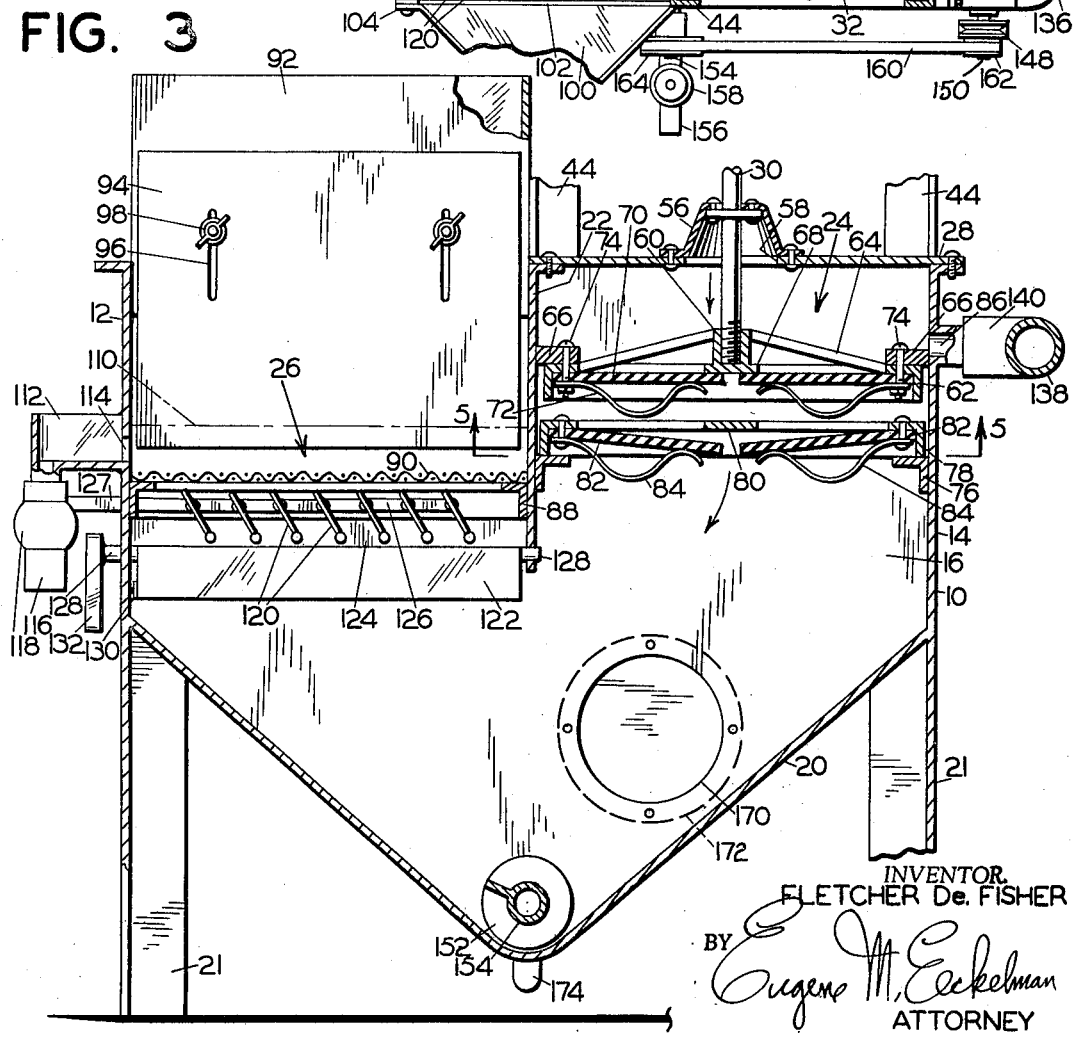
FIGURE 3 is a cross sectional view taken on the offset line 3—3 of FIGURE 4.

A longitudinally disposed dividing wall 22, FIGURE 3, is provided in the tank, this wall being vertically disposed and suitably secured to the front and rear walls of the tank. It terminates short of the bottom of the tank to provide a passageway thereunder. Disposed on one side of the wall 22 is a pumping chamber 24 and disposed on the other side is a separating chamber 26. The pumping chamber has a top wall 28 through which operates a rod 30 operable in a reciprocating movement by means now to be described.

A motor 32, FIGURE 1, is secured on top of the pumping chamber and has an output shaft 34 on which is secured a pulley 36, also seen in FIGURE 2. This pulley drives, by means of a belt 38, an upper pulley 40 secured on a shaft 42 extending parallel to the output shaft 34 of the motor and rotatably supported in a frame member 44 secured on the pumping chamber. As best seen in FIGURE 6, the shaft 42 drives a disc 46 having a drive plate 48 secured thereto. This drive plate is diametrically mounted on a face of the disc 46 and has a longitudinally adjustable mounting thereon by means of slots 50 in the plate and screws 52 disposed in the slots engaged with the disc. Plate 48 has a drive pin 54 to which the upper end of the rod 30 is pivotally connected, the pin 54 being offset from the center of the disc 46 to provide an eccentric drive. It is apparent that upon rotation of the shaft 42, the rod 30 is vertically reciprocated, and it is also apparent that the amount of throw of the rod 30 is determined by the distance of pin 54 from the center of the disc as determined by a setting of the plate on the disc.

Motor 32 is illustrated as comprising a gas engine, but of course the shaft 42 may be driven by any other suitable means. In any event, however, the drive to the shaft must be of variable speed to rotate the shaft at selected revolutions per minute.

It is desired that the rod 30 have a substantially water tight seal through the top wall 28 of the pumping chamber and also at the same time be capable of a small amount of rocking movement longitudinally of the tank, and for this purpose it projects slidably through a flexible cap 56 secured over an enlarged aperture 58 in the top wall of the tank.

Secured to the lower end of the rod 30 is a plunger 60 having a rectangular, open-center frame 62, FIGURES 3 and 4, provided with diagonally disposed reinforcing ribs 64. Secured on the upper end of the rectangular frame 62 are guide strips 66, preferably wood, slidably engaging inner walls of the pump chamber for guiding the plunger. Extending longitudinally of the plunger is a rigid plate 68 which serves as a stop plate, the purpose of which will now be described.

Secured to the rectangular frame 62 below the strip 68 are two flexible flaps or valve members 70, these flaps being attached to the frame 62 at their outer longitudinal ends. An inner longitudinal end portion of these flaps abuts against the underside of stop plate 68, and these flaps normally are held against the underside of the stop plate 68 by leaf springs 72 secured to the plunger frame. As best seen in FIGURE 3, guide strips 66, flaps 70 and springs 72 are all secured to the frame 62 by common bolts 74. As will be more apparent hereinafter, flaps 70 allow liquid which exists above the plunger to move through the latter in an upstroke thereof but serve as a pumping surface when the plunger moves in a down stroke.

Disposed below the plunger 60 in the pump chamber is a support frame 76 on which is seated an open center frame 78 also having a longitudinally disposed, central rigid plate 80. As in the plunger valve, the lower valve employs a pair of flaps or valve members 82 connected along their outer portions to the valve frame 78 and arranged to abut at their inner portions against the underside of the stop plate 80. Flaps 82 are normally held against the stop plate 80 by leaf springs 84 secured to the valve frame.

The structure of the plunger 60 and the arrangement of the valves 70 and 82 are such that when the plunger 60 is reciprocated, a pulsating action is applied to liquid in the tank. A constant supply of liquid is admitted to the pumping chamber 24 through openings 86 in the side wall 14, and these openings are disposed at a selected height in said wall such that the plunger in its up stroke travels above them and in its down stroke travels below them.

The plunger and valve structure described are such that liquid above the plunger is forced through the valves 70 on the up stroke of the plunger and liquid which exists between the valves is forced through the lower valves 82 on the down stroke of the plunger. On the up stroke of the plunger, valves 82 are pulled closed by the upward suction caused by the plunger to prevent water in the tank from moving up to the area between the two valves. Thus, the liquid which passes to the area between the valves 70 and 82 on the upstroke of the piston surges downwardly on each down stroke of the plunger to create the pulsating action in the tank.

Secured to the side walls 12 and 22 which form the separating chamber 26 in an open center frame member 88, FIGURES 3 and 4, to which is secured a screen 90, this screen extending the full length and width of the separating chamber. As best seen in FIGURE 3, the screen 90 is disposed below the liquid inlets 86. Mounted at the forward end of the tank on top thereof is a feed hopper 92 through which ore material is fed onto the forward portion of the screen 90. Hopper 92 has a baffle plate 94 secured on the rear side thereof which extends downwardly toward the screen 90. This plate has a vertically adjustable mounting engagement with the rear side of the hopper 92 by means of slots 96 therein receiving screws 98 engaged with the hopper. As will be more apparent hereinafter, it is desired that the bottom edge of the baffle plate 94 be disposed below the water level so that the ore admitted through the spout is directed straight down onto the screen. This plate primarily is intended to control the rate of feed to the screen, such rate of feed depending upon the spacing between the bottom edge of said plate and the screen.

The rear wall 18 of the tank has a discharge chute 100 mounted at a discharge opening 102, FIGURE 4, in said wall. Discharge chute 100 is secured to the rear wall by means of a mounting plate 104 therefor, FIGURE 2, which is vertically adjustable by means of slots 106 receiving screws 108 engaged with the rear wall of the tank. The vertical position of the discharge chute 100 determines the water level in the separating chamber, and as stated hereinbefore, it is desired that the water level be disposed above the screen 90. The water level 110 is shown by phantom lines in FIGURE 3. The depth of the water above the screen 90 is determined by a vertical setting of the discharge chute 100 and such depth is determined empirically to achieve a proper action of water on ore material deposited on the screen.

Leading from the side wall 12 of the tank is a discharge chamber 112, FIGURES 1, 3 and 4, communicating with the pump chamber by means of an opening 114 in the wall 112 and having a downwardly directed discharge spout 116 provided with a valve 118. The opening 114 to discharge chamber 112 is located just above the screen, and as will be apparent hereinafter, the discharge chamber is adapted to receive coarse particles only of the ore material.

Disposed below the screen 90 are two sets of baffle plates or shutters 120 and 122, FIGURES 3 and 4. The baffle plates 120 extend in parallel relation and are disposed longitudinally of the tank. They have pivoted support at their lower ends on cross-frame members 124 secured to the walls 12 and 22 of the tank. These plates are connected together by a link 126 pivotally attached thereto. One end of link 126 extends slidably through the side wall 12 and has a projecting portion 127 provided with a hand knob 127a. FIGURE 1, for slidably adjusting the link in the separating chamber to position the baffles 120 at selected angles. Baffle plates 122 similarly comprise a plurality of parallel members but instead extend cross-wise of the tank, or in other words at right angles to the plates 120. These plates are pivotally supported on end pins 128 journaled in the walls 12 and 22 and are connected together for unitary rotation by a longitudinally disposed link 130 pivotally connected thereto. One of the pins 128 projects through the wall 12 and has a lever handle 132 by means of which the baffle plates 122 may be rotated to a selected angular position.

The baffle plates 120 and 122 control the direction of fluid as it flows through the screen 90 in a pulsating action. That is, plates 120 can be angled such that liquid flow up through the screen is directed toward the wall 12 or if desired the liquid flow can be directed straight up and down or away from the wall 12. As illustrated in FIGURE 3, the pulsating liquid is directed toward the wall 12 as it moves up through the screen, whereby the ore on the screen also is urged in such direction. The setting of baffle plates 120 illustrated is preferred since the coarse particles in the ore material are directed toward and deposited in the discharge chamber 112.

Baffle plates 122 serve to control the speed of movement of the ore material along the screen. That is, if the baffle plates are only slightly tipped toward the discharge chute 100, the ore material will move slowly toward such end. If tipped at a greater angle, the ore material will move faster along the screen. Thus, it is apparent that by suitable angular settings of the baffle plates 120 and 122 the movement of the ore from the pulsating action of the liquid can be controlled. Selective settings of the plates 120 and 122 may also be made to compensate for any tilting of the apparatus in its placement on a supporting surface. That is, if the apparatus should not be mounted perfectly horizontal in both directions, as a result of an irregular supporting surface therefor, the plates may be adjusted to compensate for such tilting.

Liquid is forcefully supplied to the openings 86 in the pulsating chamber 24 by a pump 134, FIGURES 2 and 4, having an outlet pipe 136 which is connected between the ends of a manifold 138 having end outlets 140 leading to the inlet openings 86. The pump has an inlet conduit 141 leading to a source of liquid supply. The manifold has two valves 142 one of which is located on one side of the connection of the pump outlet pipe 136 with the manifold 138 and the other of which is located on the other side of such connection. By means of the valves 142, the volume of flow to the two ends of the pulsating chamber can be controlled to subject the screen to a greater pulsating flow at one portion thereof than another portion if desired. That is, if one of the valves 142 is fully open and the other valve is only partly open, the screen at its end transversely aligned with the fully open valve will be subjected to a greater volume of liquid than the other end. In the event that it is desired to subject the ore adjacent the inlet end of the device to a greater agitation than the other end, such valve control is set empirically to achieve the most desired separation.

The pump 134 is driven by the output shaft 34 of the motor 32. For this purpose, a pulley 144 is secured on the output shaft of the motor and this pulley drives, by means of a belt 146, a pulley 148 secured on the pump shaft 150.

The bottom of tank 10 is provided with a longitudinally disposed auger conveyor 152, FIGURES 1 and 3, supported on a shaft 154 journaled in the forward and rearward end walls 16 and 18 of the tank. The purpose of the conveyor 152 is to move concentrates toward a discharge spout 156 leading from the rearward bottom portion of the tank. Discharge spout 156 has a valve 158 therein for controlling the flow through the spout. Conveyor 152 has a drive connection with the pump shaft 150 by means of a belt 160 and pulleys 162 and 164 on the shafts 150 and 154, respectively.

Side wall 12 of the tank has a viewing aperture 166, FIGURE 1, at the upper portion thereof for visual inspection of the interior of the separating chamber. This aperture has a transparent covering 168 such as glass or plastic. Front end wall 16 of the tank has a clean-out port 170, FIGURE 3, covered by a removable plate 172.

Means are also provided for forcefully flushing the tank, and for this purpose the outlet pipe 136 of the pump has an extension conduit 174, FIGURES 1 and 4, leading to the forward end of the tank at the bottom thereof. Conduit 174 has a valve 176 therein for controlling flow through such conduit. If it is desired to flush out the tank, valve 158 in the discharge spout 156 is opened, the valves 142 in the manifold are closed, and the valve 176 is opened. Liquid under pressure from the pump is thus admitted to the forward end of the tank to cause a flushing action through the tank.

OPERATION

In the operation of the present ore separating apparatus, the pump is put in operation to supply fluid to the tank, it being assumed that the valves 142 are open and the valves 118 and 176 are closed. With the motor 32 in operation to cause reciprocating motion of the plunger 60, ore is admitted through the feed hopper 92 onto the forward portion of the screen 90. As the plunger reciprocates in the chamber 24, the liquid is moved in a pulsating action through the screen to agitate the ore. With a proper setting of the baffle plates 120 and 122 the ore will be advanced along the screen 90 toward the discharge chute 100. As the ore advances, the fines or lighter specific gravity particles are suspended in the liquid and the heavier specific gravity particles or concentrates, pass down through the screen and settle at the bottom of the tank. The fines, being in suspension, are carried out through the discharge chute 100. With a proper angular setting of the baffle plates 120, any particles which cannot pass through the screen move into the discharge chamber 112 at the side of the device. The valve 158 remains open to permit the conveyor 152 to discharge the concentrates.

It has been found that the water level in the separating chamber will maintain itself at a point lower than the water level in the pulsating chamber, such of course resulting from the restriction of fluid flow through the ore and screen 90. Baffle plates 120 and 122 are selectively angled to compensate for any tilted mounting of the machine as well as to move the ore toward the discharge end and toward the wall 12 if desired. In addition, the valves 142 may be selectively set to cause a differential in the volume of pulsating liquid, if desired, at the forward and rearward portions of the screen. Valve 118 may be opened periodically to remove large particles from chamber 112.

In the operation of the separating apparatus, the discharge chute is vertically positioned, by means of its adjustment means 107 and 108, to maintain a desired liquid level in the separating chamber, it being desired that the said liquid level be well above the screen 90. The rate at which the ore is treated is controlled by the vertical setting of baffle plate 94. That is, if the plate is adjusted so that its bottom edge is close to the screen a slow feed rate is accomplished, and the farther the bottom edge of such baffle plate is disposed above the screen the faster the feed rate will be.

It is to be understood that the form of my invention herein shown and described is to be taken as a preferred example of the same and that various changes in the shape, size and arrangement of parts may be resorted to without departing from the spirit of my invention or the scope of the subjoined claims.

Having thus described my invention, I claim:
1. Ore separating apparatus comprising:
    (a) a tank,
    (b) upright wall means in said tank defining a separating chamber and a pulsating chamber,
    (c) said wall means terminating short of the bottom of said tank to provide communication between said separating chamber and said pulsating chamber,
    (d) inlet means at one end of said separating chamber for admitting material to be separated,
    (e) outlet means in said separating chamber,
    (f) a screen across said separating chamber arranged to receive material from said inlet means and disposed above the bottom of said wall means,
    (g) a reciprocatable plunger in said pulsating chamber arranged to pulsate a liquid in said tank through said screen means and in said separating chamber, causing heavier specific gravity particles in the ore to pass through the screen and settle on the bottom of the tank and causing lighter specific gravity particles to become suspended in the liquid and carried away therewith through said outlet means,
    (h) liquid inlet means in said pulsating chamber,
    (i) a plurality of upright baffle plates under said screen extending longitudinally of said tank,
    (j) a plurality of upright baffle plates also disposed under said screen extending transversely of said tank and vertically spaced from said longitudinally extending baffles,
    (k) and means mounting said longitudinally and transversely extending baffle plates in said tank for adjustable movement angularly with relation to the screen for directing selectively the angle of upward flow of said liquid in both longitudinal and transverse directions as it flows through said screen in the pulsating movement thereof.
2. The ore separating apparatus of claim 1 including a discharge chamber at one side of said separating chamber disposed in a plane just above the said screen for receiving larger particles of the material being separated.
3. The ore separating apparatus of claim 1 including
    (a) at least two inlet means in said pulsating chamber spaced from each other longitudinally of said pulsating chamber,
(b) and including individual valves in said inlet for selectively controlling the flow of liquid to each inlet means.

References Cited

UNITED STATES PATENTS

| | | | |
|---|---|---|---|
| 1,058,349 | 4/1913 | Bookwalter | 209—455 |
| 1,360,116 | 11/1920 | King | 209—457 |
| 1,603,351 | 10/1926 | Moyer | 209—457 XR |
| 1,952,277 | 3/1934 | Montgomery | 209—457 |
| 2,781,129 | 2/1957 | Remer | 209—455 |
| 2,979,203 | 4/1961 | Moore | 209—455 |

FOREIGN PATENTS 578,502　6/1959　Canada.

FRANK W. LUTTER, Primary Examiner

U.S. Cl. X.R.

209—484, 494, 500